US006842869B2

(12) United States Patent  
Goodman (10) Patent No.: US 6,842,869 B2
(45) Date of Patent: Jan. 11, 2005

(54) METHOD TO MAINTAIN NONVOLATILE SYSTEM INFORMATION CACHED IN A DISTRIBUTED CONTROL NETWORK

(75) Inventor: Brian Gerard Goodman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 09/877,466

(22) Filed: Jun. 8, 2001

(65) Prior Publication Data

US 2002/0188894 A1 Dec. 12, 2002

(51) Int. Cl.$^7$ ................................................ G06F 11/00
(52) U.S. Cl. .......................................... 714/43; 714/5
(58) Field of Search .............................. 714/43, 4, 5, 6

(56) References Cited

U.S. PATENT DOCUMENTS

| | | | | |
|---|---|---|---|---|
| 5,625,841 A | * | 4/1997 | Dawkins et al. | 710/15 |
| 5,644,767 A | * | 7/1997 | Rathunde | 713/1 |
| 5,666,486 A | * | 9/1997 | Alfieri et al. | 709/217 |
| 5,895,493 A | * | 4/1999 | Gatica | 711/147 |
| 6,173,413 B1 | * | 1/2001 | Slaughter et al. | 714/6 |
| 6,282,670 B1 | * | 8/2001 | Rezaul Islam et al. | 714/6 |
| 6,336,174 B1 | * | 1/2002 | Li et al. | 711/162 |
| 6,480,970 B1 | * | 11/2002 | DeKoning et al. | 714/6 |
| 6,496,942 B1 | * | 12/2002 | Schoenthal et al. | 714/4 |
| 6,510,527 B1 | * | 1/2003 | Woerner et al. | 714/5 |
| 2001/0047482 A1 | * | 11/2001 | Harris et al. | 713/200 |

\* cited by examiner

Primary Examiner—Robert Beausoliel
Assistant Examiner—Yolanda L Wilson
(74) Attorney, Agent, or Firm—Dale F. Regelman (57) ABSTRACT

A method to maintain cached system information stored in one or more nodes disposed within a distributed control network. A method to operate a remote node disposed in Applicant's distributed control network using cached system information in the event of a communication failure between the master node and a remote node. A data storage and retrieval system which includes a computer useable medium having computer readable program code disposed therein to implement Applicant's method to maintain cached system information stored in one or more nodes disposed therein. A data storage and retrieval system which includes a computer useable medium having computer readable program code disposed therein to implement Applicant's method to operate a remote node disposed in Applicant's distributed control network using cached system information in the event of a communication failure between the master node and the remote node.

16 Claims, 9 Drawing Sheets

METHOD TO MAINTAIN NONVOLATILE SYSTEM INFORMATION CACHED IN A DISTRIBUTED CONTROL NETWORK

FIELD OF THE INVENTION

Applicant's invention relates to a distributed control network which can be used to operate, for example, a data storage and retrieval system. Applicant's invention further relates to a method to maintain system information stored, or cached, in one or more nodes disposed within Applicant's distributed control network.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, and the like. One (or more) accessors typically accesses the data storage media from the storage slots and delivers the accessed media to a data storage drive for reading and/or writing data on the accessed media. Suitable electronics operate the accessor(s) and operate the data storage drive(s) to transmit to, and/or to receive data from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy and to enhance performance.

In data storage and retrieval systems it is desirable to store vital product data ("VPD") in a single location to simplify update and backup of such data. By "vital product data" Applicant means system information that must be maintained in nonvolatile storage. At least one copy of such system information must be maintained in nonvolatile memory because this information is essential to the operation of, for example, a data storage and retrieval system. Such VPD includes configuration data, calibration data, part number(s) and serial number(s) for associated assemblies, statistical performance data, and the like.

In prior art data storage and retrieval systems, a single controller operates all aspects of the system. In contrast, Applicant's data storage and retrieval system utilizes a distributed control network which includes a plurality of nodes. Applicant has found it desirable to cache VPD on one or more nodes of that distributed control network. In addition to caching a copy of the VPD at one or more nodes disposed in Applicant's distributed control network, it is also necessary to update this VPD from time to time.

One node in Applicant's distributed control network may require, for example, simple network management protocol (SNMP) code to communicate with a remote host computer. That SNMP node may require nonvolatile configuration data, including host names and/or host IP addresses. A communication failure within the distributed control network should not prevent the SNMP node from communicating with a host because error reporting is one of the SNMP functions.

However, providing hard drives or battery-backup RAM at every node, such as the SNMP node, is costly and impractical. What is needed is a method to maintain and update VPD cached at one or more remote nodes in Applicant's distributed control network.

SUMMARY OF THE INVENTION

Applicant's invention includes a method to maintain system information cached at various nodes in a distributed control network, such as a distributed control network disposed within a data storage and retrieval system. Applicant's distributed control network includes a master node and at least one remote node in communication with the master node. By master node, Applicant means a node which contains a master copy of the VPD, master information.

The master node includes a master node memory in which is stored master information comprising the master copy of the VPD. Generally, this master information comprises the most recent version of the VPD. The remote node includes a remote node memory in which is stored remote node information comprising a copy of the VPD previously provided to that node. In certain embodiments, the remote node information is stored in the same nonvolatile memory device as the program code for that node, thereby allowing VPD caching at that node at little or no incremental cost.

Applicant's invention includes the steps of providing master information to a first remote node, comparing that master information to the remote node information, and storing the master information in the first remote node memory if that master information differs from the remote node information. Applicant's invention further includes a data storage and retrieval system which includes Applicant's distributed control network and which further includes a computer useable medium having computer readable program code disposed therein for implementing Applicant's method to maintain VPD stored within that distributed control network.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method to maintain system information cached in one or more nodes of a distributed control network is not meant, however, to limit Applicant's invention to either data storage and retrieval systems, or to data processing applications, as the invention herein can be applied to portable cartridge handling systems in general.

Figure 1:
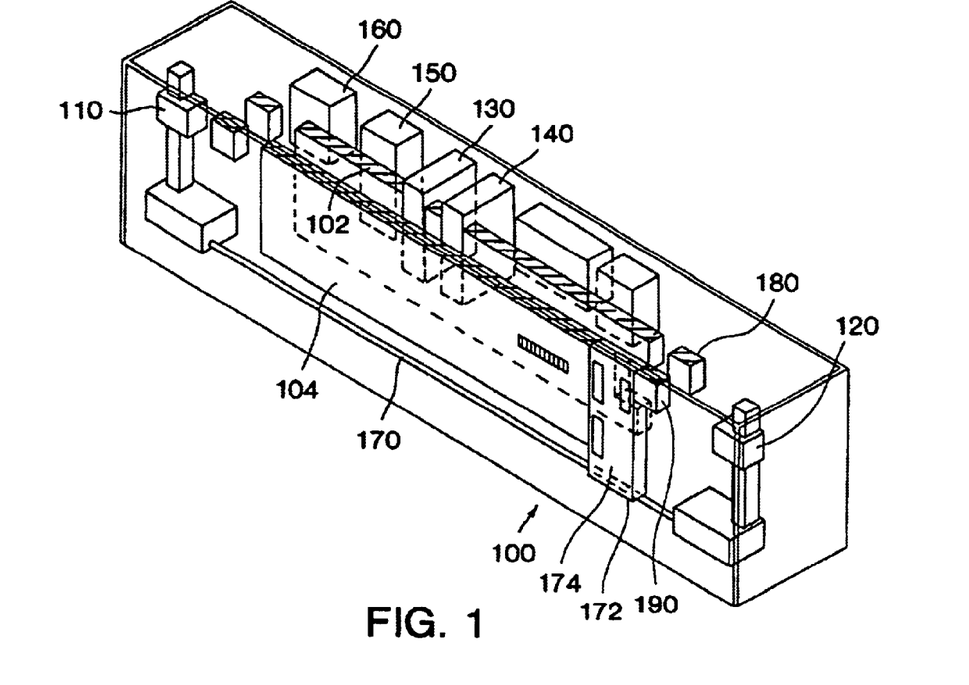
FIG. 1 is a perspective view of a first embodiment of Applicant's data storage and retrieval system utilizing a distributed control system.

Referring to FIG. 1, automated data storage and retrieval system 100 is shown having a first wall of storage slots 102 and a second wall of storage slots 104. Portable data storage cartridges are individually stored in these storage slots. Such portable data storage cartridges comprise a data storage media disposed within a portable container, i.e. a cartridge. Examples of such data storage media include magnetic tapes, optical disks of various types, including ROM, WORM, and rewritable, and the like.

Applicant's automated data storage and retrieval system includes one or more accessors, such as accessors 110 and 120. An accessor is a robotic device which accesses portable data storage media from first storage wall 102 or second storage wall 104, delivers that accessed media to data storage drives 130/140 for reading and/or writing data thereon, and returns the media to the proper storage slot.

Figure 4:
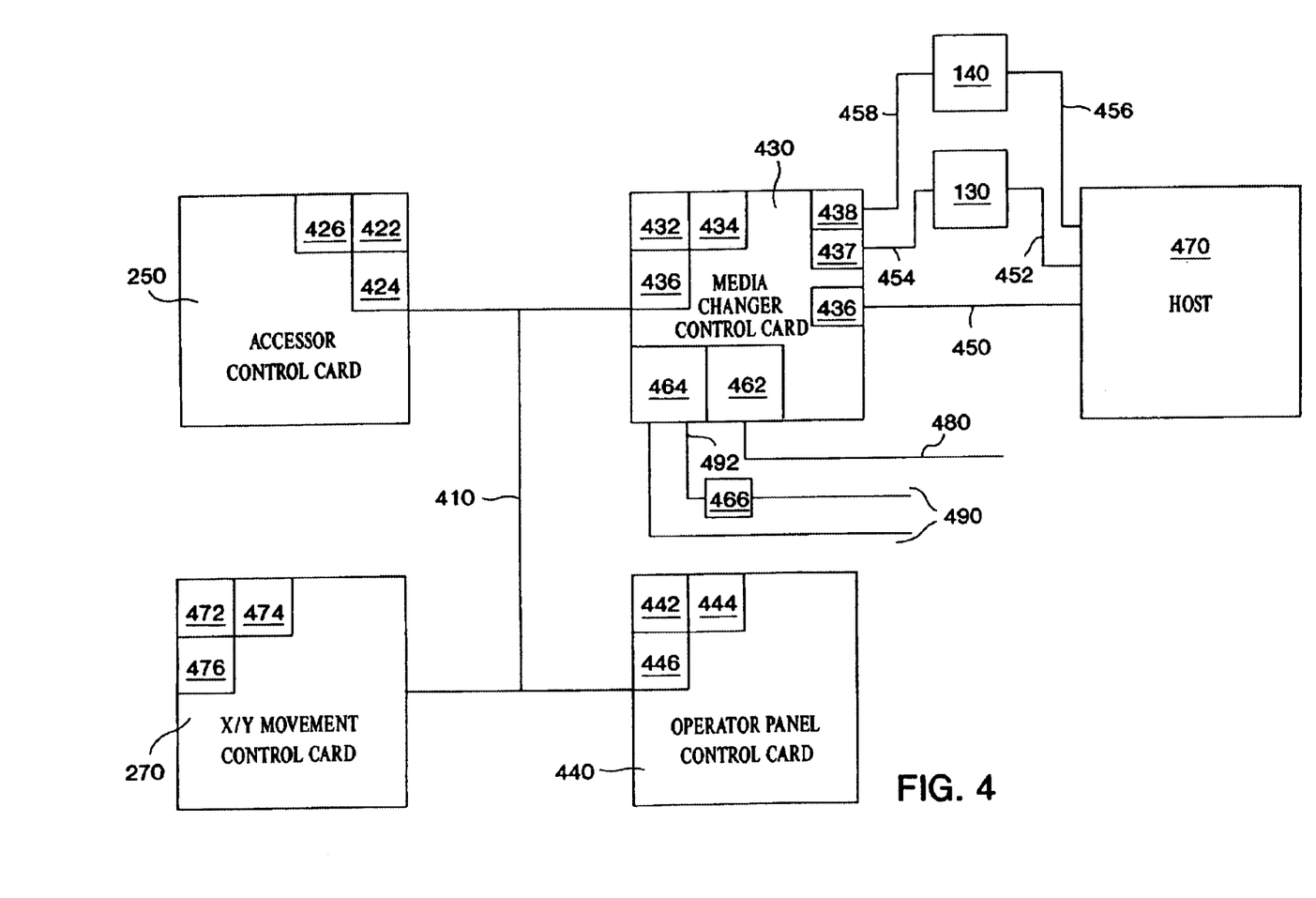
FIG. 4 is a is a schematic showing a first embodiment of Applicant's distributed control network.
Figure 5A:
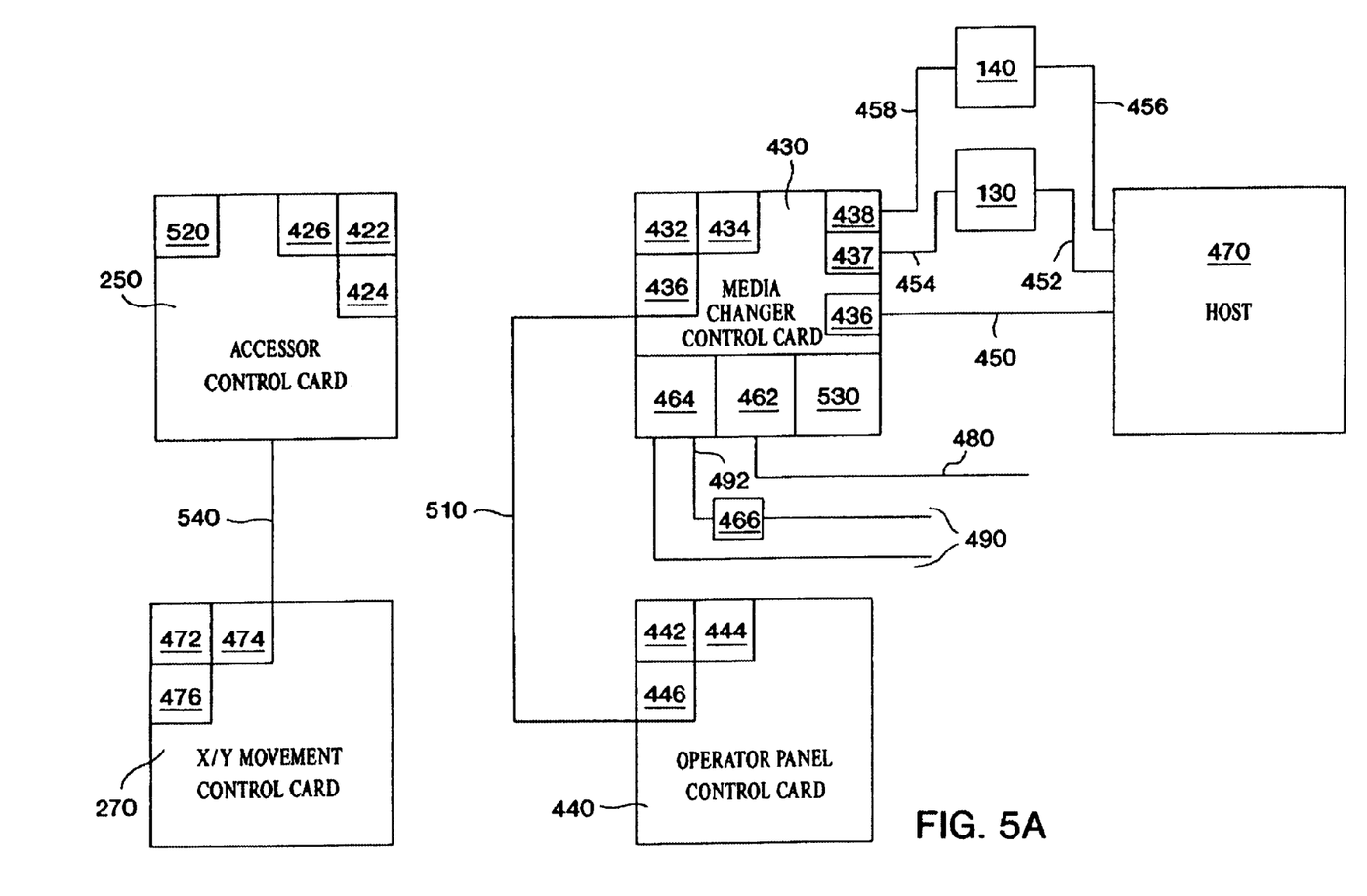
FIG. 5A is a schematic showing a second embodiment of Applicant's distributed control network.
Figure 5B:
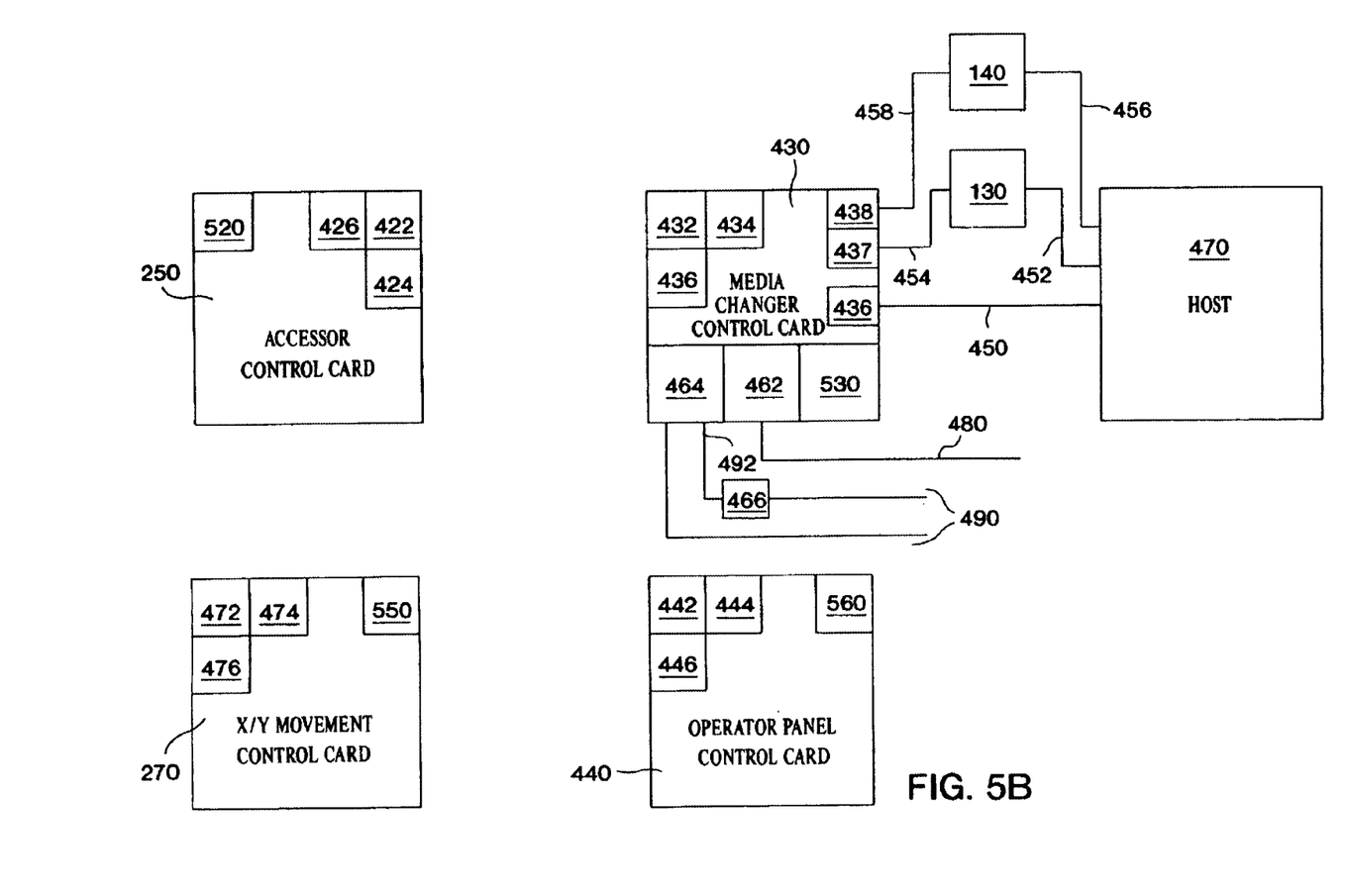
FIG. 5B is a schematic showing a third embodiment of Applicant's distributed control network.

As shown in FIG. 1, accessors 110 and 120 travel bi-directionally along rail 170 in an aisle disposed between first wall of storage slots 102 and second wall of storage slots 104. Motion control pack 160 includes media changer control card 430 (FIGS. 4, 5A, 5B). Media changer control card 430 communicates with host computer 470 (FIGS. 4, 5A, 5B).

Referring again to FIG. 1, operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

Figure 2:
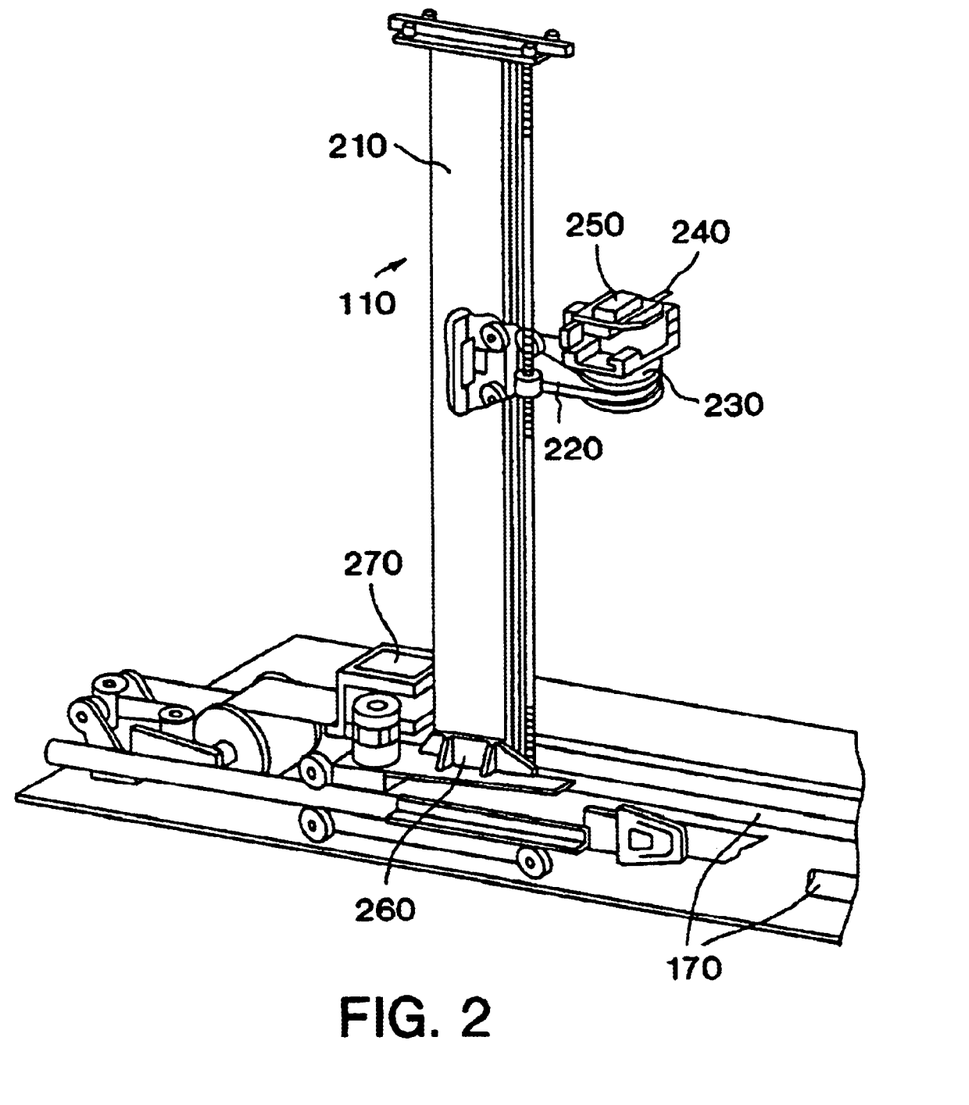
FIG. 2 is a perspective view of an accessor moveably disposed in the data storage and retrieval system of FIG. 1.

Referring to FIG. 2, accessor 110 travels bi-directionally along rail system 170. In the embodiment shown in FIG. 2, rail system 170 comprises two parallel rails. Accessor 110 includes vertical pillar 210 which connects to carriage assembly 260. Lifting servo section 220 moves vertically along pillar 210. In the embodiment shown in FIG. 2, accessor 110 includes first gripper mechanism 230, second gripper mechanism 240, and accessor control card 250. In the embodiment shown in FIG. 2, X/Y movement control card 270 is disposed on carriage assembly 260.

Figure 3:
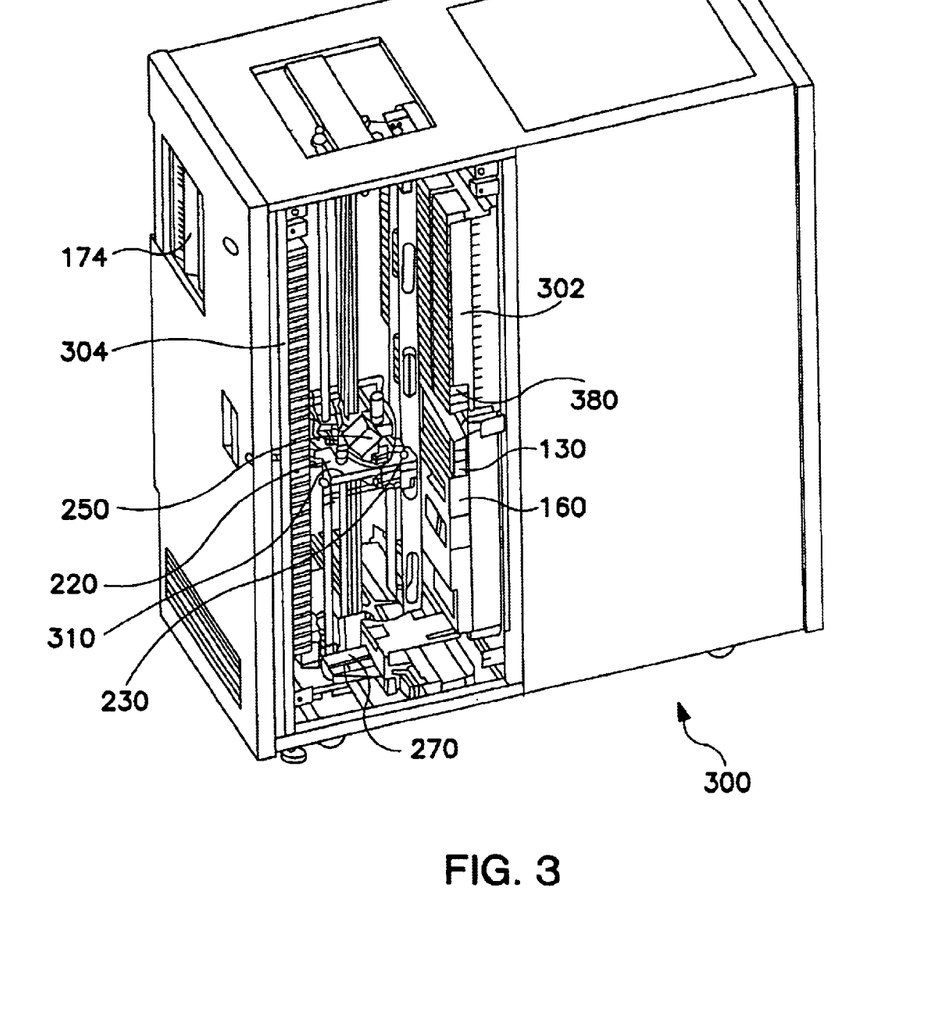
FIG. 3 is a perspective view of a second embodiment of Applicant's data storage and retrieval system utilizing a distributed control system.

FIG. 3 shows system 300 which comprises another embodiment of Applicant's data storage and retrieval system. System 300 includes first storage wall 302 and second storage wall 304. Storage walls 302 and 304 each include a plurality of storage elements in which can be stored a plurality of portable data storage cartridges. System 300 includes one or more data storage drives, such as drive 130. Drive 130 comprises a floppy disk drive, an optical disk drive, a magnetic tape drive, and the like. System 300 further includes motion card pack 160. System 300 further includes operator control panel 150 (not shown in FIG. 3).

System 300 further includes one or a plurality of portable data storage cartridges 380. Each cartridge contains a data storage media internally disposed therein. Such data storage media includes optical media, magnetic media, tape media, and the like.

System 300 also includes at least one robotic accessor 310 for transporting a specified portable data storage cartridge, such as cartridge 380, between a storage slot disposed in first wall 302 or second wall 304 and data storage drive 130. Accessor 310 includes lifting servo section 220 on which is disposed at least one cartridge gripping mechanism 230 and accessor control card 250. Accessor 310 further includes X/Y movement control card 270.

FIG. 4 shows a first embodiment of Applicant's distributed control network used in data storage and retrieval systems 100 and 300. This distributed control system includes accessor control card 250 (FIGS. 2, 3, 4, 5A, 5B), X/Y movement control card 270 (FIGS. 2, 3, 5A, 5B), operator panel control card 440 (FIGS. 4, 5A, 5B) and media changer control card 430 (FIGS. 5A, 5B).

Communication bus 410 interconnects accessor control card 250, X/Y movement control card 270, operator panel control card 440 and media changer control card 430. In certain embodiments, bus 410 comprises an ethernet interconnection or a CANbus interconnection. Those skilled in the art will appreciate that CANbus technology was developed in the automotive industry, but now has gained wide acceptance in other industries.

Accessor control card 250 is disposed on lifting servo section 220 (FIGS. 2, 3) of accessor 110/120/310 (FIGS. 1, 2, 3). In the embodiment shown in FIG. 4, accessor control card 250 includes microprocessor 422, non-volatile memory 424, and volatile memory 426.

Operator control panel control card 440 is disposed within operator control panel 150 (FIG. 1). In the embodiment shown in FIG. 4, operator panel control card 440 includes microprocessor 442, nonvolatile memory 444, and volatile memory 446.

X/Y movement control card 270 is disposed on carriage portion 260 of accessors 110 (FIGS. 1, 2) and 120 (FIG. 1), and on the base portion of accessor 310 (FIG. 3). In the embodiment shown in FIG. 4, X/Y movement control card 270 includes microprocessor 472, nonvolatile memory 474, and volatile memory 476.

Media changer control card 430 is disposed within motion control pack 160 (FIGS. 1, 3). Media changer control card 430 includes microprocessor 432, nonvolatile memory 434, and volatile memory 436. In certain embodiments, media changer control card 430 includes network interface 462 which interconnects media changer control card 430 to one or more networks, such as network 480. In certain embodiments, network 480 comprises one or more local area networks, one or more private wide area networks, one or more public wide area networks, the internet, and combinations thereof.

In certain embodiments, media changer control card 430 includes device 464 which interconnects media changer control card 430 to one or more telephone systems, such as telephone system 490. In certain embodiments, device 464 comprises a modem. In these embodiments, modem 464 interconnects directly with telephone system 490. In alternative embodiments device 464 comprises a modem interface. In these embodiments, modem interface 464 interconnects via communication link 492 to modem 466. Modem 466 connects to telephone system 490. In certain embodiments, telephone system 490 comprises one or more private telephone systems, one or more public telephone systems, and combinations thereof.

Host computer 470 communicates with data storage drive 130 (FIGS. 1, 3, 4, 5A, 5B) and data storage drive 140 (FIGS. 1, 4, 5A, 5B) via communication links 452 and 456, respectively. Data storage drives 130/140 communicate with media changer control card 430 via communication links 454/458 and interfaces 437/438, respectively. In certain embodiments, host computer 470 also communicates with media changer control card 430 via communication link 450 and interface 436. As those skilled in the art will appreciate, communication link 450 and interface 436 provide a control path into Applicant's distributed control network. Communication links 450, 452, 454, 456, and 458, are selected from the group comprising a serial interface, a local area network, a private wide area network, a public wide area network, a SCSI interface, a Fibre Channel interface, and combinations thereof.

FIG. 5A shows an alternative embodiment of Applicant's distributed control network. Accessor control card 250 includes wireless communication device 520. Media changer control card 430 includes wireless communication device 530. Communication link 540 interconnects accessor control card 250 and X/Y control card 270. Communication link 510 interconnects operator panel control card 440 and media changer control card 430. In certain embodiments, buses 510 and 540 comprise ethernet interconnections, CANbus interconnections, and combinations thereof.

In this embodiment, media changer control card 430 and/or operator panel control card 440 communicate(s) with accessor control card 250 and/or X/Y movement control card 270 via wireless communication using wireless communication devices 520 and 530. Such wireless communication employs emissions in the infrared spectrum, emissions in the visible light spectrum, frequencies from about 1 MHz to about 10 GHz, and combinations thereof.

FIG. 5B shows a second alternative embodiment of Applicant's distributed control network. In this embodiment, accessor control card includes wireless communication device 520, media changer control card 430 includes wireless communication device 530, X/Y movement control card 270 includes wireless communication device 550, and operator panel control card 440 includes wireless communication device 560. In this embodiment, the nodes in Applicant's distributed control network communicate with one another by wireless communication. Such wireless communication employs emissions in the infrared spectrum, emissions in the visible light spectrum, frequencies from about 1 MHz to about 10 GHz, and combinations thereof.

In certain embodiments, accessor control card 250 (FIGS. 2, 3, 4, 5A, 5B) serves as the master node in Applicant's distributed control network. By "master node," Applicant means the node that contains the master copy of the VPD. In these embodiments, media changer control card 430, X/Y movement control card 270, and operator panel control card 440 comprise remote nodes. Vital product data required to operate Applicant's data storage and retrieval system includes system configuration data, device addresses for the robotic accessors/data storage drives/control ports/operator control panel, network management data, calibration data, modem management data, statistical data regarding actual performance of the data storage and retrieval system, and the like.

In the embodiments wherein accessor control card 250 comprises the master node, the most recently updated VPD is stored, or cached, in nonvolatile memory device 424 (FIGS. 4, 5A, 5B). In these embodiments, the VPD stored in nonvolatile memory device 424 comprises the master information. In these embodiments, nonvolatile memory device 424 comprises the master node nonvolatile memory. Nonvolatile memory device 424 is selected from the group comprising a hard disk drive, a floppy disk/floppy disk drive combination, an optical disk/optical disk drive combination, an IBM Microdrive, a PCMCIA memory device such as manufactured by Calluna, and solid state nonvolatile memory devices including an erasable programmable read-only memory (EPROM), an electrically erasable programmable read-only memory (EEPROM), Flash PROM, battery backup RAM, and the like.

Nonvolatile memory device 434 (FIGS. 4, 5A, 5B) disposed on media changer control card 430, nonvolatile memory device 474 (FIGS. 4, 5A, 5B) disposed on X/Y movement control card 270 (FIGS. 2, 3, 4, 5A, 5B), and nonvolatile memory device 444 (FIGS. 4, 5A, 5B) disposed on operator panel control card 440 (FIGS. 4, 5A, 5B), serve as remote node nonvolatile memory devices. Nonvolatile memory devices 434, 444, and 474 are selected from the group comprising PROMs, EPROMS, EEPROMS, Flash PROMS, battery backup RAM, and the like.

First remote node information comprising a copy of previously-provided master information is stored, or cached, in nonvolatile memory device 434. Similarly, second remote node information and third remote node information comprise copies of previously-provided master information, and are cached in nonvolatile memory devices 444 and 474, respectively. From time to time, the remote node VPD cached in nonvolatile memory devices 434, 444, and 474, must be updated.

Figure 6:
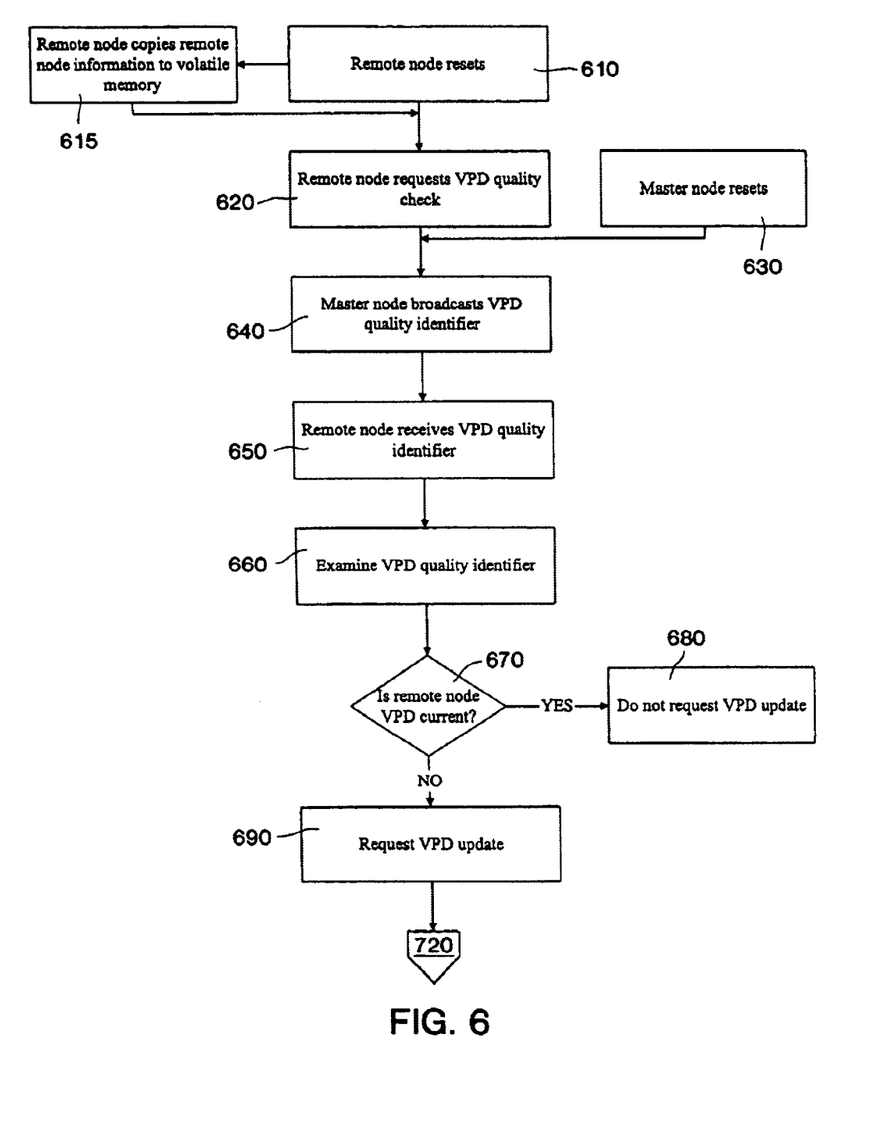
FIG. 6 is a flowchart summarizing a first embodiment of Applicant's method to update VPD cached in one or more remote nodes disposed within Applicant's data storage and retrieval system.

FIG. 6 summarizes a first embodiment of Applicant's method to maintain the remote node VPD cached in one or more remote nodes of Applicant's distributed control network. In the event a remote node resets in step 610, in step 620 that remote node requests the master node provide a VPD quality check. In certain embodiments, the resetting remote node includes volatile memory. In those embodiments, in step 615 the remote node information currently stored in the nonvolatile memory located at the resetting remote node is copied to the volatile memory disposed at that node. Applicant's method then moves to step 640. In the event the master node resets in step 630, in step 640 that master node broadcasts a VPD quality check to one or more remote nodes.

In certain embodiments, accessor control card 250 comprises the master node. In other embodiments, X/Y movement control card 270 comprises the master node. In yet other embodiments, media changer control card 430 (FIGS. 4, 5) comprises the master node. In still other embodiments, operator panel control card 440 comprises the master node. In alternative embodiments, each node includes a master copy of the VPD.

In step 640, the master node broadcasts a master information identifier. In certain embodiments, the master information identifier comprises a checksum value for the master information. As those skilled in the art will appreciate, a checksum value comprises a numerical value which is based upon the number of set bits in the master control information. Such a checksum may be 8 bits(modulo 256 sum), 16 bits, 32 bits, or some other size. Such a checksum value is computed by summing the bytes or words of the master information. In alternate embodiments, the master information identifier comprises a version number.

In certain embodiments, a remote node may require an update of only part of the master information. In these embodiments, the master information comprises one or more segments, where each such master information segment has its own checksum value. In these embodiments, the remote node in step 620 requests a quality check for one or more segments of the master information. In step 640, the master node provides a VPD identifier for one or more segments of the master information requested by the remote node.

In step 650, the remote node receives the master information identifier/master information segment identifier(s) provided by the master node. In step 660, the remote node compares that identifier with the identifier for the VPD/VPD segment(s) cached locally. In embodiments where the master information identifier comprises a checksum value, each remote node compares the checksum value provided by the master node with the checksum value for the VPD currently stored in that remote node memory.

In step 670 the remote node determines whether the remote node information cached locally is the same as, or differs from, the master information identifier received. In the event the master information checksum matches the remote node information checksum, then in step 670 that remote node determines that the locally cached VPD is current. This being the case, in step 680 that remote node does not request a VPD update.

In the event the master information checksum does not match the remote node information checksum in step 670, then in step 690 that remote node requests the master node provide some or all of the master information and Applicant's method moves to step 720.

In embodiments where the master information identifier comprises a version number, then in step 670 the remote node compares the version number for the master information/master information segments(s) provided by the master node with the version number for the VPD/VPD segment(s) currently stored in that remote node memory. In the event the master information version number matches the remote node information version number, then in step 680 that remote node does not request a VPD update. On the other hand, if the master information version number does not match the remote node information version number, then in step 690 the remote node requests the master node provide some or all of the master information, and Applicant's method moves to step 720.

Figure 7:
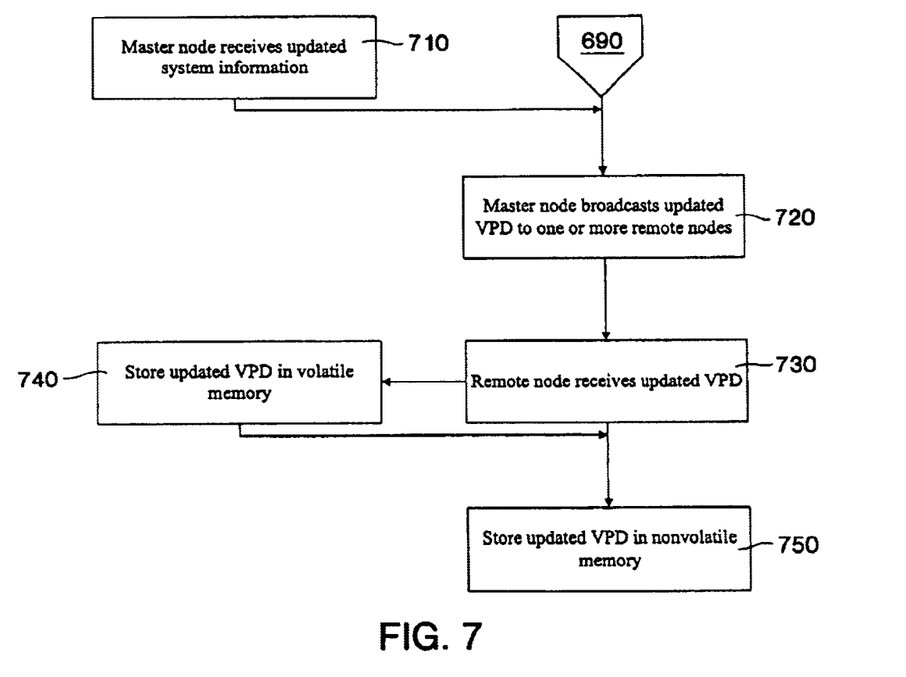
FIG. 7 is a flowchart summarizing additional steps in the first embodiment of Applicant's method.

Referring now to FIG. 7, in addition to responding to a request for updated VPD from one or more remote nodes, when the master node receives updated VPD in step 710, that master node in step 720 provides updated master information to one or more remote nodes. The master node can receive updated VPD in a number ways. Such updated VPD can be received from host computer 470 (FIGS. 4, 5A, 5B). Updated VPD can be read from a portable data storage cartridge using device 130/140 (FIGS. 1, 3, 4, 5A, 5B), or directly from device 130/140. Updated VPD can be obtained using network interface 462 (FIGS. 4, 5A, 5B) and network 480 (FIGS. 4, 5A, 5B). Updated VPD can be obtained using modem 464/466 (FIGS. 4, 5A, 5B) and telephone system 490 (FIGS. 4, 5A, 5B). Updated VPD can be entered via operator control panel 150 (FIG. 1). Updated VPD can also be generated internally by the library system.

Upon receipt of master information in step 730, the remote node stores that updated VPD locally. In certain embodiments, the updated VPD is immediately stored in the nonvolatile memory device disposed at that remote node in step 740. In alternative embodiments, however, in step 750 one or remote nodes store a working copy of the VPD in volatile memory. In these embodiments, the one or more remote nodes store both remote node nonvolatile information and remote node volatile information. In these embodiments, the master information provided by the master node is stored in both the volatile memory and the nonvolatile memory at that remote node. As those skilled in the art will appreciate, volatile RAM disposed at a node may have a faster access time than the nonvolatile memory disposed at that node.

In certain embodiments wherein one or more remote nodes store both nonvolatile remote node information and volatile remote node information, volatile remote node information is periodically written to the nonvolatile memory. When updated VPD is received at such a remote node, a timer is activated such that the updated VPD written to the volatile memory in a specified time interval, such as ten (10) minutes for example.

In certain embodiments, certain aspects of the VPD, such as historical operational data, is generated internally by the master node. In these embodiments, a timer disposed in the master node periodically, such as on a daily basis, automatically causes the master node to broadcast updated VPD to one or more nodes in the system. Even if this updated VPD is initially stored in volatile memory located at those one or more remote nodes, eventually that updated VPD will be copied to the nonvolatile memory disposed at that node(s). As those skilled in the art will appreciate, certain nonvolatile memory devices have a limited number of write cycles. Therefore, limiting the number of rewrites to these nonvolatile memory devices increases the useful lifetime of these devices.

In these dual remote node information embodiments, a remote node can access cached volatile remote node information while writing that volatile remote node information to the nonvolatile memory. As those skilled in the art will further appreciate, writing information to nonvolatile RAM is often a relatively slow process. Therefore, caching updated system information initially in volatile memory allows that updated VPD to be available during the process of copying that updated VPD to nonvolatile memory.

Figure 8:
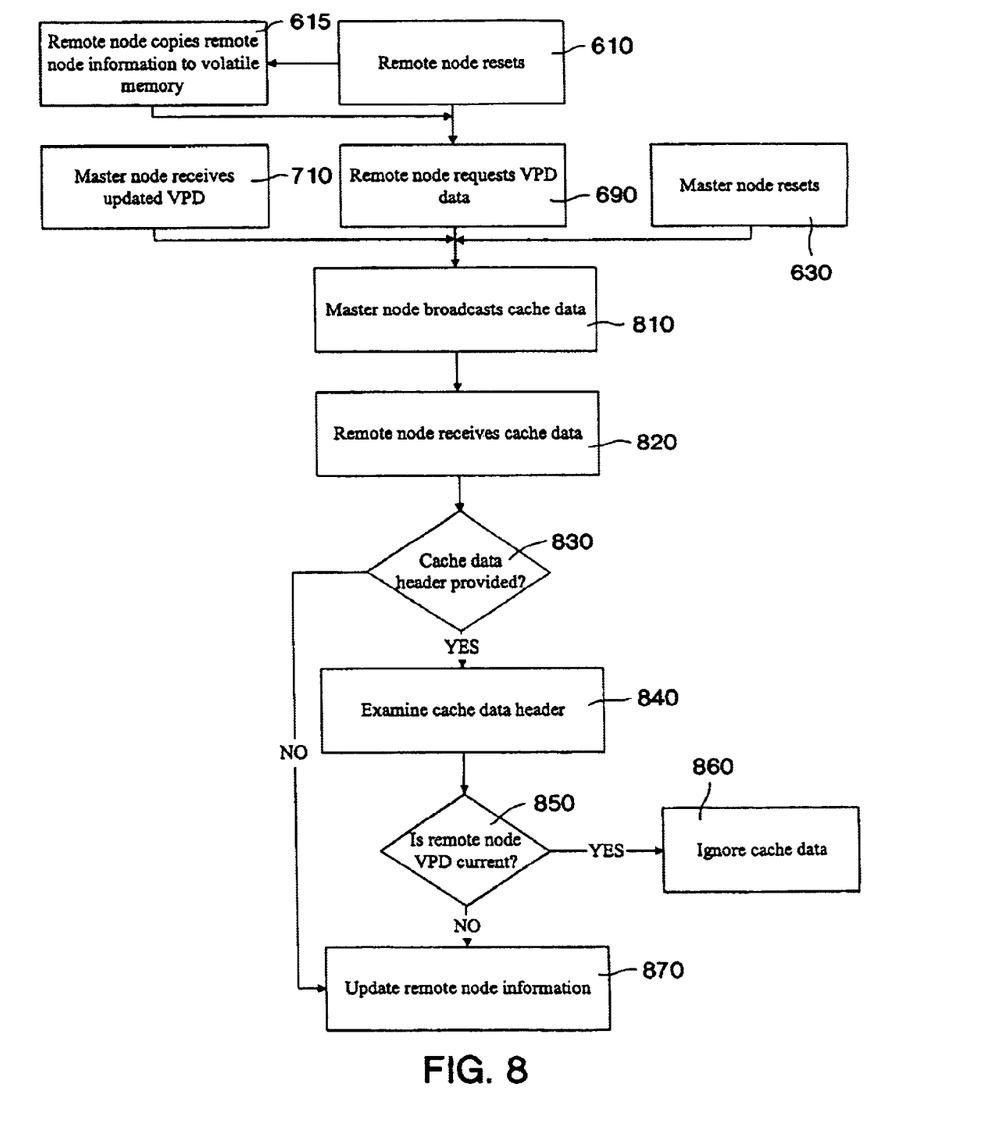
FIG. 8 is a flowchart summarizing a second embodiment of Applicant's method.

FIG. 8 summarizes a second embodiment of Applicant's method to maintain the remote node VPD cached in one or more remote nodes. In step 810, the master node broadcasts cache data to one or more remote nodes in response to one of a number of events. For example, receipt of updated VPD by the master node in step 710 (FIG. 7) causes the master node to broadcast that updated VPD in step 810. In the event the master node resets in step 630 (FIG. 6), then the master node broadcasts master information to one or more remote nodes in step 810. In the event a remote node resets in step 610 (FIG. 6), then that resetting remote node in step 690 (FIG. 6) requests the master node provide VPD. In certain embodiments, that resetting remote node in step 615 (FIG. 6) copies the remote node information cached locally in nonvolatile memory to the local volatile memory, and then in step 690 requests the master node provide master information.

In step 810 the master node provides master information, i.e. cache data, to, for example, X/Y movement control card 270 (FIGS. 2, 3, 4, 5A, 5B), media changer control card 430 (FIGS. 4, 5A, 5B), and operator panel control card 440 (FIGS. 4, 5A, 5B). In certain embodiments, the cache data provided in step 810 comprises at least two components, namely a cache data header and master information. In alternative embodiments, the cache data provided in step 810 comprises only master information.

In certain embodiments wherein the cache data includes a cache data header, that cache data header comprises at least two components, which include a master information identifier and a master information data size. In certain embodiments, the master information identifier comprises a checksum value for the master information. In alternate embodiments, the master information identifier comprises a version number.

In step 810, the master node broadcasts cache data. In step 820, that cache data is received at a remote node. In certain embodiments, the cache data provided by the master node includes a cache data header. In these embodiments, Applicant's method transitions from step 820 to step 840, and includes steps 840, 850, and 860. Alternatively, in the embodiments where a cache header is not provided, then Applicant's method transitions from step 820 to step 870, and the remote node stores the newly-received master information locally in step 870.

If a cache data header is provided, then in step 840 the remote node examines that cache data header. More specifically, that remote node examines the master information identifier. In step 850, the remote node compares the master information identifier with the identifier for the VPD cached locally. In the event the master information identifier matches the remote node information identifier, then in step 860 that remote node ignores the cache data broadcast. In the event the master information identifier does not match the remote node information identifier in step 850, then in step 870, the remote node stores the newly-received master information locally. As discussed above, in certain embodiments, that updated master information is only stored, or cached, in nonvolatile memory. In other embodiments, that updated master information is cached in both volatile and nonvolatile memory.

In the event of a communication failure wherein the master node cannot communicate with one or more remote nodes disposed within Applicant's distributed control network, each remote node having a locally cached copy of VPD, i.e. first master information comprising a first master information identifier, continues to operate using that cached VPD. After communication has been restored, the remote node may request a VPD quality check in accord with step 620 (FIG. 6) of Applicant's method, or the remote node may request the current VDP in accord with step 690 (FIGS. 6, 8) of Applicant's method. Prior to such a VPD request, the remote node may copy the VPD cached locally to volatile memory disposed locally. See, step 615 (FIG. 6).

In response to that VPD quality check request, in step 640 (FIG. 6) the master node provides the master information identifier for the most current system information, i.e. a second master information identifier. In step 670 (FIG. 6), the remote node compares the first master information identifier associated with the cached VPD with the second master information identifier associated with the most recent VPD to determine if the cached VPD is still current. In the event the first master information identifier differs from the second master information identifier, then in step 690 the remote node requests the master node provide updated master information, i.e. second master information. That updated master information is cached locally by the remote node in accord with Applicant's method summarized in FIG. 7 and described above.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method to operate a remote node in a distributed control network in the event of a communication failure between said remote node and the master node, comprising the steps of:

providing a data storage and retrieval system comprising a distributed control network comprising a remote node, and an interconnected master node comprising an accessor control card disposed on an accessor moveably disposed in said data storage and retrieval system, wherein said accessor further comprises a master node memory and first master information comprising a first master information identifier stored in said master node memory;

providing said first master information to said remote node;

storing said first master information in said remote node memory; and operating said remote node using said first master information in the event of a communication failure between said master node and said remote node.

2. The method of claim 1, wherein said remote node memory comprises nonvolatile memory.

3. The method of claim 1, wherein said remote node memory comprises volatile memory and nonvolatile memory.

4. The method of claim 3, wherein said storing step comprises the step of storing said first master information in said volatile memory.

5. The method of claim 4, wherein said storing step further comprises the step of copying said first master information from said volatile memory to said nonvolatile memory.

6. The method of claim 1, further comprising the steps of:
requesting a master information quality check;
receiving a second master information identifier;
comparing said first master information identifier to said second master information identifier; and
requesting second master information if said first master information identifier differs from said second master information identifier.

7. The method of claim 6, wherein said first master information identifier comprises a first master information checksum value and wherein said second master information identifier comprises a second master information checksum value.

8. The method of claim 6, wherein said first master information identifier comprises a first master information version number and wherein said second master information identifier comprises a second master information version number.

9. An information storage and retrieval system comprising a distributed control network, a remote node comprising a remote node memory, a master node in communication with said remote node, wherein said master node comprises an accessor control card disposed on an accessor moveably disposed in said data storage and retrieval system, wherein said accessor further comprises a master node memory and first master information comprising a first master information identifier stored in said master node memory, said information storage and retrieval system further comprising a computer useable medium having computer readable program code disposed therein for operating said remote node in the event of a communication failure between said remote node and the master node, the computer readable program code comprising a series of computer readable program steps to effect:

provuding said first master information to said remote node;

storing said first master information in said remote node memory; and operating said remote node using said first master information in the event of a communication failure between said master node and said remote node.

10. The information storage and retrieval system of claim 9, wherein said remote node memory comprises nonvolatile memory.

11. The information storage and retrieval system of claim 9, wherein said remote node memory comprises volatile memory and nonvolatile memory.

12. The information storage and retrieval system of claim 11, wherein said computer readable program code further comprises a series of computer readable program steps to effect storing said first master information in said volatile memory.

13. The information storage and retrieval system of claim 12, wherein said computer readable program code further comprises a series of computer readable program steps to effect copying said first master information from said volatile memory to said nonvolatile memory.

14. The information storage and retrieval system of claim 9, wherein said computer readable program code further comprises a series of computer readable program steps to effect:

requesting a second master information identifier;

receiving a second master information identifier;

comparing said first master information identifier to said second master information identifier; and requesting second master information if said first master information identifier differs from said second master information identifier.

15. The information storage and retrieval system of claim 14, wherein said first master information identifier comprises a first master information checksum value and wherein said second master information identifier comprises a second master information checksum value.

16. The information storage and retrieval system of claim 14, wherein said first master information identifier comprises a first master information version number and wherein said second master information identifier comprises a second master information version number.

* * * * *